United States Patent [19]

Sweeney

[11] 4,121,618
[45] Oct. 24, 1978

[54] HYDRAULIC RAMPING CIRCUIT FOR CONTROL VALVE

[75] Inventor: William T. Sweeney, Ponca City, Okla.

[73] Assignee: Continental Oil Company, Ponca City, Okla.

[21] Appl. No.: 749,848

[22] Filed: Dec. 13, 1976

[51] Int. Cl.² .................. F16K 31/18; F15B 15/22; F15B 13/16; F15B 13/04
[52] U.S. Cl. ........................... 137/412; 91/27; 91/358 R; 91/410
[58] Field of Search ............. 91/27, 361, 362, 358 R, 91/410; 137/386, 412; 251/30; 302/15

[56] References Cited

U.S. PATENT DOCUMENTS

| | | | |
|---|---|---|---|
| 2,696,196 | 12/1954 | Adams et al. | 91/361 |
| 2,976,843 | 3/1961 | Weibel | 91/27 |
| 3,690,730 | 9/1972 | Sakata et al. | 302/15 |
| 3,955,593 | 5/1976 | Umphrey et al. | 137/344 |
| 3,957,076 | 5/1976 | Jamison et al. | 137/355.17 |

*Primary Examiner*—Martin P. Schwadron
*Assistant Examiner*—A. Michael Chambers
*Attorney, Agent, or Firm*—William J. Miller

[57] ABSTRACT

A hydraulically actuated control valve normally includes a hydraulic cylinder which has an internal piston connected through a shaft to the actuating mechanism in the control valve. Ports are provided on each side of the piston through which fluid flows to move the piston axially inside the cylinder. The piston can be controlled electrically by an electro-hydraulic servo-controlled valve which includes an electrical input, a mechanical feedback input, and first and second outputs. The outputs are connected to the two ports in the cylinder, a mechanical feedback is coupled to the shaft and the mechanical feedback input of the control valve, and an electrical circuit is coupled to the electrical input of the servo-controlled valve to signal the hydraulic portion of the valve to either move the shaft in a manner to close the valve or move the shaft in a manner to open the valve. An improved control apparatus is provided which serially connects a solenoid valve in one of the lines of the hydraulic output of the servo-controlled valve with one of the ports in the cylinder. The solenoid valve can be bypassed with a needle valve or a controllable valve. A mechanical actuator on the shaft is coupled through an electrical circuit to the solenoid valve. Thus, if the valve is signaled to close at a high rate of speed at a predetermined time, the mechanical circuit will trigger the solenoid valve, causing the speed to diminish to a preselected rate in order to prevent water hammer. As the valve reaches a position where it is nearly closed, an electrically controlled valve can be substituted for the solenoid valve so that the rate of closure can be other than linear if desired. Furthermore, the circuit can be modified to change the opening of the valve in any desired manner.

11 Claims, 3 Drawing Figures

4,121,618

HYDRAULIC RAMPING CIRCUIT FOR CONTROL VALVE

BRIEF DESCRIPTION OF THE PRIOR ART

The closest patent is U.S. Pat. No. 1,926,869 issued to Galloway. In that patent the rate of advance of a mechanical device which is advanced by a hydraulic piston connected to a shaft is controlled at preselected positions by a mechanical-hydraulic circuit. The means of accomplishing the variation in advanced speed, however, is radically different than that disclosed in this invention. Galloway uses a sliding valve which opens various ports to accomplish the variation in speed of the piston in a control cylinder.

This invention, however, is an improvement over an existing device manufactured by FISHER Controls, the best example of which is shown in a catalogue bulletin 61.5:320 published January, 1973, and specifically labeled 320 Series electro-hydraulic actuator. In that apparatus a valve actuator is illustrated using a mechanical feedback to an electro-servo valve. The electro-servo valve is ported directly from the output to the ports in the cylinder.

BRIEF DESCRIPTION OF THE INVENTION

This invention is an improvement on an electrohydraulic actuator similar to that manufactured by FISHER Controls and above described. One of the basic problems with some applications of the electro-hydraulic actuator described is the generation of a severe water hammer when the valve controlled by the actuator reaches its nearly closed postion. The rapid shutoff of the fluids flowing through the valve creates a damaging water hammer effect, particularly in the downstream side of the control valve. The water hammer can be so severe that the pumps, valves, and other apparatus including the line can be stressed to the fracture point. This invention provides a means for rapid closure of the valve which closure rate is absolutely necessary under precision control conditions, and yet prevents the water hammer effect by suddenly slowing the closure of the valve when it reaches the point where water hammer would be developed if the valve were closed at that same rate.

The modification in closure rate is accomplished by mechanically sensing the position of the shaft, coupling the actuator cylinder to the valve, and, once a predetermined position is realized, an output is generated by the mechanical sensing device which output is applied to a valve inserted in series with one of the lines coupling the series hydraulic valve output with one of the ports in the actuator cylinder. The remotely-operated valve can be a solenoid valve which is normally open when connected in parallel with a needle valve which is adjusted to provide a flow which will substantially reduce the closure rate of the actuator cylinder shaft. If the valve can be opened at any rate without creating a water hammer, a check valve can be inserted in parallel with the needle valve in the direction to permit free flow of fluids through the check valve when the piston in the actuator chamber is being repositioned in the direction to open the valve. Instead of a solenoid valve, other variations can be substituted to create other than linear responses when a faster closure rate is necessary at the critical point in the closure of the valve.

DETAILED DESCRIPTION OF THE INVENTION

Figure 1:
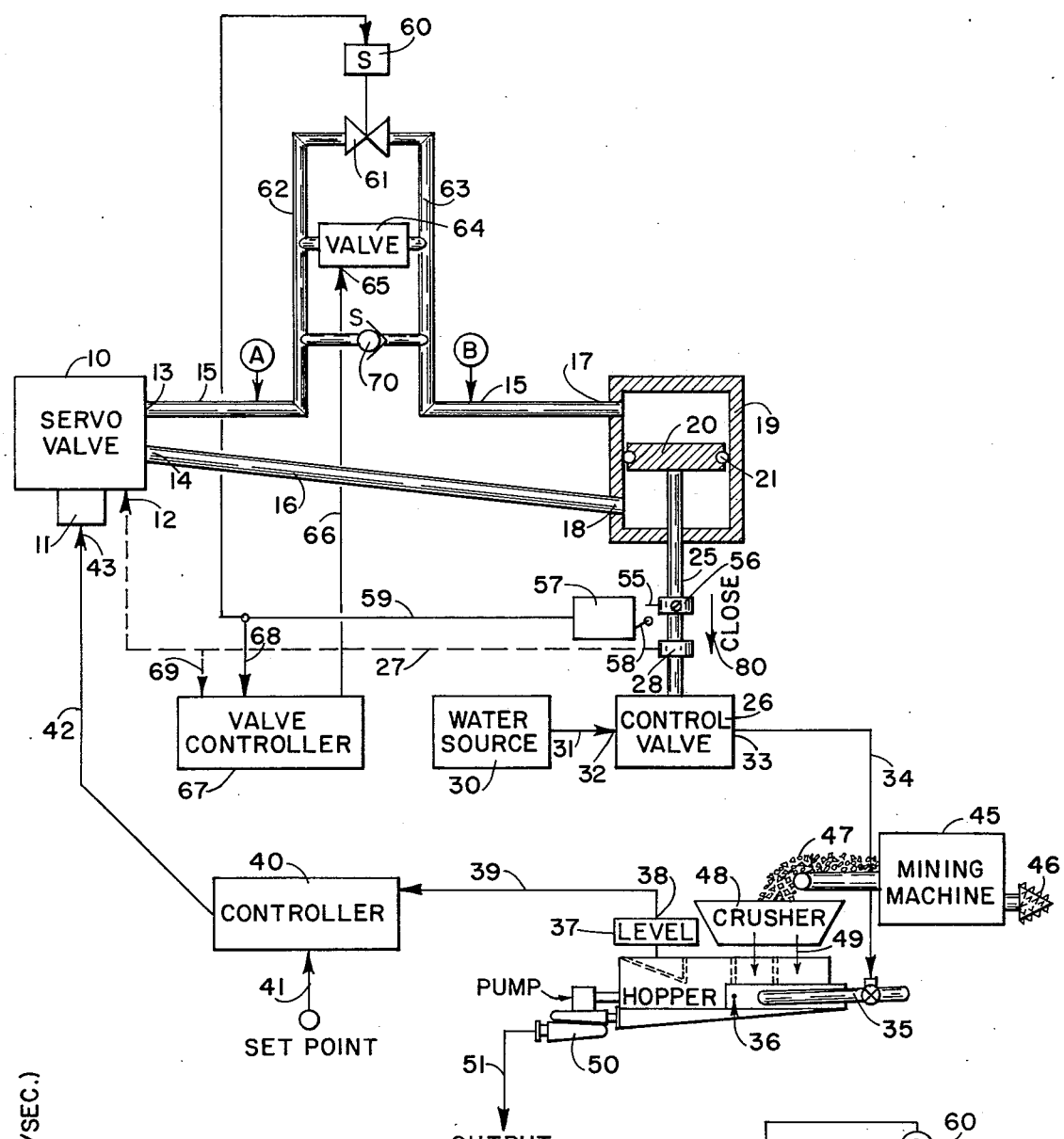
FIG. 1 is a schematic layout of the servo-controlled valve illustrating the placement of the control valve and the operation of the system in conjunction with a slurry transportation mining system.

Similar numbers will be used throughout the specification for similar elements.

The electro-hydraulic actuator ordinarily includes a servo-valve 10 which has an electrical control apparatus 11, a mechanical input 12, and output hydraulic ports 13 and 14. The servo-valve hydraulic ports are coupled through pipes 15 and 16, respectively, to input ports 17 and 18 of actuator cylinder 19. Cylinder 19 contains a piston 20 slidably sealed to cylinder 19 with an "0" ring 21, for example. A shaft 25 is axially coupled to piston 20 and to a control valve 26. Valve 26 is the normal fluid type valve such as a "V" ball valve which is actuated by rotating the valve stem. Several types of valves could be used in place of the "V" ball valve 26 as long as the valve is actuated either by a sliding type closure or by rotation of the stem through suitable mechanical means. A mechanical feedback 27 is coupled to shaft 25 by a clamp or other suitable means 28 and to the mechanical feedback input 12 of servo-valve 10. A water source 30 is coupled through a pipe 31 to the inlet 32 of control valve 26. The outlet 33 of control valve 26 is coupled through a pipe 34 to a manifold 35 of a slurry hopper generally referred to by arrow 36. Slurry hopper 36 is nearly filled with water which is maintained at a proper height by a level sensor 37 which has an electrical output 38 coupled through a wire 39 to controller 40. Controller 40 has a preselected set point 41 which compares the voltage or signal through wire 39 and generates an output on a wire 42 which is applied to an input 43 of electrical control apparatus 11 of servo-valve 10. A mining machine 45 removes coal in the ordinary manner with a plurality of digger elements 46 and conveys dislodged coal 47 into a crusher element 48, for example. The material, once crushed, falls in the direction of arrows 49 into slurry hopper 36. The material in slurry hopper 36 is mixed with water and removed by a pump 50 and discharged to an outlet line 51 where it is transported to the surface of the mine, for example. One of the basic problems with the system as above constructed is the excessive water hammer which developed when control valve 26 was rapidly closed as was necessary in order to prevent overflow of water from hopper 36.

The invention primarily consists of a means for preventing the creation of conditions which lead to the generation of a water hammer in the system caused by the rapid closure of control valve 26. It was discovered that the control valve 26 could be closed at a high closure rate until the valve was approximately 75 percent closed. At that point, if closure continued at the same rate, a water hammer would develop. In order to slow down the closure rate once the valve was 75 percent closed, a shaft position sensing circuit was installed which consists of a cam 55 adjustably attached through a collar 56 to shaft 25. An electrical switch 57 is positioned so that its switch arm 58 can be operated by cam 55. An output circuit is coupled through a wire 59 to a solenoid 60 which operates a valve 61. Valve 61 is connected through pipes 62 and 63 in series with pipe 15 so that the fluid flowing through pipe 15 must flow through valve 61. A second valve 64 is positioned parallel with valve 61 and may be a needle valve which can be adjusted to a predetermined flow or an electrically operated valve having an input 65 which is coupled through a wire 66 to a valve controller 67. An input 68 is, likewise, coupled from wire 59 to valve controller 67. A mechanical feedback 69 can also be coupled to the mechanical feedback 27.

Depending upon the operations desired, a check valve 70 can, likewise, be positioned in parallel with valves 61 and 64. Other combinations of valves can be utilized as, for example, that illustrated in FIG. 3. Such a system can be installed in the circuit shown in FIG. 1 at points A–B and essentially consists of a solenoid 60 coupled to a solenoid-operated valve 61 as previously described and a needle valve 75 coupled in parallel with valve 61.

Depending upon the operation desired, a check valve 70 can be positioned, likewise, in parallel with the previously mentioned valves.

OPERATION

The operation will first describe the system as used without the invention incorporated.

Water from source 30 travels through pipe 31 to inlet 32 of control valve 26. From control valve 26 the water travels out outlet 33 through pipe 34 to manifold 35 where it is distributed into hopper 36. Level sensing apparatus 37 measures the height of the water in hopper 36 and develops an output 38 corresponding to said height. The height will vary on occasions, depending upon the amount of coal dislodged by mining machine 45 and conveyed into crusher 48 which, as previously described, falls in the direction of arrows 49 into hopper 36. As the water level varies as a consequence in variation in the amount of coal being deposited into hopper 36, level sensor 37 will have its output delivered through wire 39 to controller 40.

Figure 2:
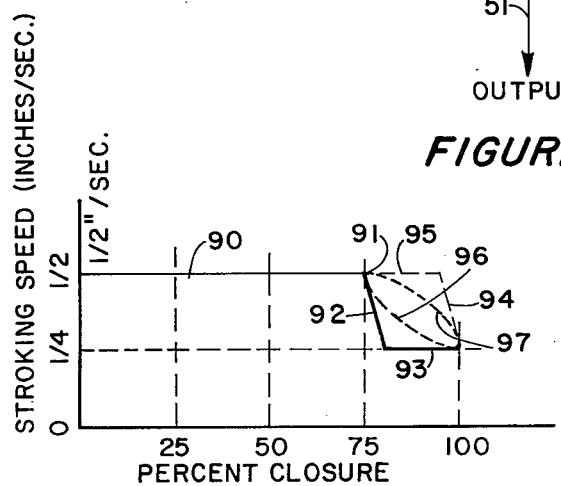
FIG. 2 is a graph showing the stroking speed versus percentage closure of the shaft in relationship to the control valve.
Figure 3:
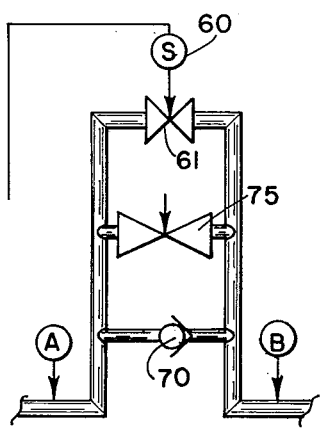
FIG. 3 is a modified form of the system shown in FIG. 1.

Set point 41 was previously set to a particular water level which may, for example, be several inches below the top of hopper 36. Thus as the signal through wire 39 varies, the variation will be compared with the set point signal 41. Any error above or below the set point signal 41 will be manipulated such that an output signal will be communicated from the controller 40 through wire 42 to input 43 of electrical control apparatus 11. Apparatus 11 will communicate this electrical variation to servovalve 10 where it will be converted to a hydraulic variation in pressure and flow through outlet ports 13 and 14. As an example, if the water level is getting too high in hopper 36, the pressure in outlet 13 will increase, causing a flow in pipe 15 to the inlet port 17 of cylinder 19. A reduction in pressure will be exhibited at port 14, causing a drop in pressure at port 18. With the increase in pressure at port 17 and a decrease in pressure at port 18, piston 20 will move in the direction of arrow 80, causing a closure in control valve 26. The amount that control valve 26 will close will depend upon the magnitude of the signal being received by electrical control apparatus 11. If the signal required complete closure of the valve, once the valve reached 75 percent closure and continued closing a severe water hammer did result. In order to eliminate the water hammer problem, a shaft position sensing apparatus was installed so that cam 55 would strike switch arm 58, signaling through wire 59 to solenoid 60 that the shaft position had been reached at which time solenoid 60 should operate valve 61. Upon closure of valve 61, fluid must then pass through valve 64 (check valve) 70 is closed when the fluid is passing from port 13 to port 17). If valve 64 is, for example, a needle valve 75 (such a valve is illustrated in FIG. 3), then the fluid will reduce by a predetermined amount. See, for example, FIG. 2 where a stroking speed is illustrated vertically and percentage closure of the valve is illustrated horizontally. Line 90 illustrates that full flow is realized until 75 percent closure is reached. At this point, illustrated by No. 91, solenoid 60 closes valve 61, and the pressure will drop along lines 92 to a new level 93 until the valve is 100 percent closed. The drop is illustrated as half that permitted when solenoid valve 61 is open. This, of course, can be set at any level and not necessarily that illustrated in the graph. When it is necessary to reverse the above process, that is, control valve 26 should now be opened, the solenoid will of necessity remain closed until cam 55 moves away from switch arm 58. If check valve 70 is not in the hydraulic circuit, the opening of valve 26 will be precisely the same speed for percentage closure as was the closing of the valve, that is, as it advances from 100 percent closure to 0 percent closure, it will overflow along lines 93, 92 and 99. With the check valve present in the hydraulic circuit, however, the valve will open along lines 94 and 95 to line 90. If valve 64 can be proportionately controlled by a valve controller circuit 67, then any actual curve can be utilized as illustrated, for example, by lines 96 or 97.

Referring to FIG. 3, fluid flowing in pipe 15 from "A" to "B" will flow freely through valve 61 and by a predetermined amount through needle valve 75. No flow will pass through check valve 70. When solenoid valve 61 is closed by solenoid 60, the only flow is through valve 75. A curve similar to 90, 92, and 93 in FIG. 2 will result. When flow through pipe 15 is reversed, check valve 70 will permit free flow as illustrated by curves 94, 95, and 90 of FIG. 2.

CONCLUSIONS

Two modifications of the ramping circuit have been illustrated. It is obvious that other combinations of circuits can be realized and still be within the spirit and scope of the invention. It is further obvious that the ramp circuit need not be supported in the particular hydraulic line 15 illustrated but can be inserted in hydraulic line 16 and work equally well. Furthermore, a single shaft position sensing circuit has been illustrated. It is further obvious that several shaft positioning circuits could be incorporated providing a plurality of steps for decreasing the shaft closure rate and vice versa.

Although only the preferred embodiment of the present invention has been illustrated and described, it will be apparent to those skilled in the art that various changes and modifications may be made therein without departing from the spirit and scope of the invention or from the scope of the appended claims.

I claim:

1. In a control valve actuated by a hydraulic system which includes a cylinder having first and second ports on each side of the piston which is slidably mounted therein, a shaft attached to said piston and mechanically connected to said control valve, an electro-hydraulic servo-control valve having an electrical and mechanical input and first and second hydraulic output ports and means for hydraulically coupling said first and second output ports to each of said first and second cylinder ports, respectively, a mechanical feedback operatively coupled from said shaft to the mechanical input of said servo-control valve, and an electrical control apparatus connected to the electrical input of said servo-valve, apparatus for controlling the rate of movement of said shaft comprising:

control valve closure sensing means responsive to a preselected closure of said control valve and developing an output signal when said preselected closure is realized;

a solenoid controlled valve and a controllable valve connected in parallel said solenoid controlled valve and said controllable valve connected in series with one of said means for hydraulically coupling said first or second output ports to said first and second cylinder ports, respectively;

a valve controller having an input and an output, and means for coupling said valve controller input to said sensing means and means for coupling the output of said valve controller to said controllable valve; and means having an input responsive to said sensing means output signal for operating said solenoid controlled valve.

2. Apparatus as described in claim 1 wherein said controllable valve has an orifice smaller than the orifice of said solenoid controlled valve.

3. An apparatus as described in claim 4 wherein the flow through said orifice is adjustable.

4. An apparatus as described in claim 1 additionally including a check valve connected in parallel with said solenoid controlled valve and said controllable valve and positioned to prevent flow through said check valve in the direction to cause closure of said control valve.

5. An apparatus as described in claim 1 additionally including a check valve connected in parallel with said solenoid operated valve and said controllable valve and positioned to prevent flow through said check valve in the direction to cause closure of said control valve.

6. An apparatus as described in claim 1 wherein said controllable valve is a needle valve.

7. An apparatus as set forth in claim 1 wherein said control valve closure sensing means comprises:

an adjustable cam mounted on said shaft; and a microswitch operable by said cam and providing said output signal for input to said solenoid operated valve.

8. In combination with a slurry mining system having a hopper containing a water inlet and a pump outlet, a liquid level sensing means disposed in said hopper and having an electrical output, and a water control valve coupled in series with said water inlet, an improved liquid level control apparatus comprising:

a cylinder having first and second hydraulic ports and a piston positioned between said ports with a shaft coupled to the operating shaft of said control valve, a servo-valve having an electrical input and first and second hydraulic outputs and a mechanical feedback input, shaft position sensing means providing, a mechanical and an electrical output and means for coupling said shaft position sensing means mechanical output to said mechanical feedback input, controller means having a set point and an input and an output, means for coupling said electrical output from said liquid level sensing means to the input of said controller means, means for coupling the output from said controller means to the electrical input of said servo-valve, a solenoid operated valve having an electrical input and hydraulic inputs and outputs, controllable valve means having its inputs and outputs connected in parallel with said inputs and outputs of said solenoid operated valve, means for coupling a hydraulic output of said servo-valve to the input of said solenoid operated valve and means for coupling the output of said solenoid operated valve to the first hydraulic port of said cylinder, means for coupling the second output of said servo-valve to the second hydraulic port of said hydraulic cylinder, and means for coupling the shaft position sensing means electrical output to the electrical input of said solenoid operated valve.

9. An apparatus as described in claim 8 wherein said controllable valve means is a needle valve.

10. An apparatus as described in claim 8 including a check valve connected hydraulically in parallel with said servo-valve and positioned to prevent flow through said check valve in the direction to cause closure of said control valve.

11. An apparatus as described in claim 9 including a check valve connected in parallel with said servo-valve and positioned to prevent flow through said check valve in the direction to cause closure of said control valve.

* * * * *

UNITED STATES PATENT OFFICE
CERTIFICATE OF CORRECTION

PATENT NO. : 4,121,618
DATED : October 24, 1978
INVENTOR(S) : William T. Sweeney It is certified that error appears in the above-identified patent and that said Letters Patent are hereby corrected as shown below:

Column 5, line 33, "4" should be --2--.

Signed and Sealed this

Thirtieth Day of January 1979

[SEAL]

Attest:

RUTH C. MASON
*Attesting Officer*

DONALD W. BANNER
*Commissioner of Patents and Trademarks*